United States Patent [19]

Moore

[11] 4,033,745

[45] July 5, 1977

[54] NON-BURNING STORABLE LIQUID FERTILIZER

[75] Inventor: William Percy Moore, Hopewell, Va.

[73] Assignee: Slo Release, Inc., Kingston, Ohio

[22] Filed: June 3, 1976

[21] Appl. No.: 692,433

[52] U.S. Cl. .................................. 71/28; 71/64 C
[51] Int. Cl.² .......................................... C05C 9/00
[58] Field of Search .................... 71/11, 25, 28–30, 71/64 C; 210/54 R

[56] References Cited

UNITED STATES PATENTS

| | | | |
|---|---|---|---|
| 2,097,876 | 11/1937 | Fuetterer | 210/54 R X |
| 3,369,884 | 2/1968 | Barron | 71/28 |
| 3,649,598 | 3/1972 | Namioka et al. | 71/29 X |
| 3,934,041 | 1/1976 | Snyder | 71/29 X |

FOREIGN PATENTS OR APPLICATIONS

| | | | |
|---|---|---|---|
| 47-5700 | 1972 | Japan | 71/28 |

OTHER PUBLICATIONS

Fertilizer Nitrogen, Its Chemistry & Technology, Savchelli, Reinhold, 1964, pp. 264–265.

*Primary Examiner*—Wilbur L. Bascomb, Jr.
*Assistant Examiner*—Ferris H. Lander

[57] ABSTRACT

A complete, non-burning, liquid fertilizer suspension, releasing nitrogen as required by plants without damage by high concentrations of contained nitrogen, comprising highly polymerized urea-formaldehyde, water soluble sugars, aliphatic alcohols, and water. To achieve desired properties solids content totals 50–70% by weight; sugars, 3 to 10%; alcohols, 0.05 to 1.0%; and urea to formaldehyde mol ratio is 1.7 to 2.3. Said composition retains pH of 6 to 7, viscosity of 200 to 350 centipoises, and stable suspension character until applied, and then stimulates growth of plants, particularly grasses.

2 Claims, No Drawings

NON-BURNING STORABLE LIQUID FERTILIZER

BACKGROUND OF THE INVENTION

This invention relates to a new, stabilized, storable, fluid lawn fertilizer which provides for the slow, efficient, release of nitrogen so that large amounts of fertilizer may be applied directly without burning injury of wasteful loss of nutrients. More particularly, it relates to the composition of a storable suspension of high urea formaldehyde polymers stabilized for storage by its composition, and by alcohol and sugar additives.

Liquid mixed fertilizers are normally solutions of chemicals which are soluble in water and supply the primary plant nutrients; namely, nitrogen, phosphorous, and potassium. The present invention is directed primarily to suspensions containing all three primary nutrients and necessary secondary and micronutrients. Unlike normal liquid mixed fertilizers, most of the nitrogen content in the present invention is water insoluble while most of the phosphorous, and potassium is soluble.

Problems in growing grasses, as well as crops, have long been associated with the lack of a fertilizer which would allow direct application of the economically required amount of plant foods without plasmolysis, or damage to the plants. The damage to the plant is usually caused by contact with the foliage, or excess root uptake of the soluble nitrogen. The damage to the grasses usually takes the form of foliage burn, where the grass turns yellow, or if the burn is severe, the grass is killed.

The art of applying complete fertilizers containing nitrogen to grasses was advanced by the development of solid urea formaldehyde polymer based fertilizers which had reduced burning tendencies when evenly applied to grasses. One of the early developments in this area was U.S. Pat. No. 2,827,368, Everett N. Mortenson et al, entitled, "Non-Burning Plant Fertilizer". There are now several slow-release urea formaldehyde based solid fertilizers produced and marketed commercially in the United States. Although these products do provide delayed release of much of the nitrogen, the nitrogen content is not efficiently used because of inherent problems in obtaining even distribution of solids, and in obtaining even release of nitrogen from the wide range of urea-formaldehyde polymer molecular weights contained in the solids.

Many workers have reported efforts to apply the efficient liquid techniques in this field. U.S. Pat. No. 3,119,683 by Joseph P. Kealy reported that urea-formaldehyde solutions, containing 1/1 to 2.75/1 urea to formaldehyde mol ratio with 25% or less water, and pH 6.8–7.3 at 30°–250° C were stable for 24 hours or less. This product was water soluble and would quickly release its nitrogen and burn turf if it were applied in significant amounts. In subsequent U.S. Pat. No. 3,235,370 Kealy provided a product which was storable for about 30 days by adding strong base. This product was an improved ingredient for producing solid urea-formaldehyde fertilizers but was not suitable for direct application. Hewson in U.S. Pat. No 3,183,200 advanced the art of urea-formaldehyde fertilizers further by providing a practical process for storable urea-formaldehyde water soluble concentrates.

Charles E. Waters in U.S. Pat. No. 3,096,168 advanced the fertilizer art by preparing suspensions of urea-formaldehyde in liquid mixed fertilizer containing appreciable amounts of water insoluble nitrogen. These suspensions of urea-formaldehyde in water were prepared by reacting 1 to 2.5 mols of urea per mol of formaldehyde under acid conditions along with other water soluble fertilizer ingredients. Typically, a practical product from U.S. Pat. No. 3,096,168 contained only 1.8% water-insoluble nitrogen. Although the water insoluble nitrogen content of U.S. Pat. No. 3,096,168 was appreciable, in several cases almost 5% N, the still higher water soluble nitrogen content made the product likely to burn grasses when applied directly at commercially desirable rates.

The art of producing fluid fertilizers containing water-insoluble nitrogen was further advanced by U.S. Pat. No. 3,677,736 by Richard E. Formaini which provided preparation methods by which liquid fertilizer suspensions containing urea formaldehyde polymers having high activity indices can be prepared. It does not allow conversion of substantially all of the nitrogen in the fluid fertilizer to water-insoluble form.

Neither of the fluid products from U.S. Pat. Nos. 3,096,168 or 3,677,736 may be stored for commercially required periods of time, and both products contain large portions of water soluble nitrogen which would cause hazard of foliage burn if applied directly to grasses particularly in hot, dry weather.

The use of fluid delayed release nitrogen fertilizers on grasses and lawn foliage is most desirable from the standpoints of economics, efficacy, and ease of application. There has been to date little commercial use of this type of product.

Problems with existing art which prevent commercialization are:

1. When the urea-formaldehyde polymerization is not carried far enough to convert most of the nitrogen to water-insoluble form, direct application, especially on grass foliage, causes burning by the water nitrogen.

2. When urea-formaldehyde polymerization is carried far enough to convert most of the nitrogen to the water-insoluble form to prevent burning, the release of the water-insoluble nitrogen is delayed for such an extended period that it is either physically or chemically lost from the crop site before it is used.

3. Urea-formaldehyde water-insoluble polymer suspensions produced to date have not been stable enough for even limited storage periods. The polymers continue to grow in molecular weight and within several days, the fluid fertilizer turns into a semi-solid which cannot be handled in pipes, pumps, nozzles, and tanks. The use of highly diluted products to prevent gelling and solids formation, results in the urea-formaldehyde polymers settling out rapidly to the bottom of the storage of distribution tanks.

In view of the foregoing, it is an object of this invention to provide an improved, storable, liquid, urea-formaldehyde-based lawn fertilizer composition which is safe for direct application to grass turfs.

It is another object of this invention to provide a liquid urea-formaldehyde-based fertilizer which releases polymerized nitrogen to grasses, and other plants, in an efficient and timely manner.

It is another object of this invention to provide an improved fluid urea-formaldehyde-based fertilizer which does not settle or separate and may be stored, handled, diluted, and applied effectively to lawns and to crops in practical and commercially available liquid fertilizer equipment.

Other objects and advantages of the present invention will be evident from the following description of the invention.

SUMMARY OF THE INVENTION

It has been discovered that the foregoing objects can be achieved by a neutral suspension fertilizer containing 8–16%, by weight, of nitrogen in the form of urea-formaldehyde polymers and 35 to 55%, by weight, water.

The urea and formaldehyde components of the fertilizer are completely reacted leaving no free formaldehyde of urea in solution. The urea-formaldehyde polymers comprise the main source of nitrogen in the fertilizer. The degree of polymerization is such that more than half of the nitrogen is water insoluble, as defined in the Official Methods of Analysis of the Association of Official Agricultural Chemists, tenth edition.

The presence of relatively small amounts of alcohols in the fertilizer significantly improves the storability of the urea-formaldhyde-based fluid fertilizer. The alcohol inhibits the growth, gelling, and precipitation of the neutral urea formaldehyde polymers in the said fluid fertilizers.

Water-soluble liquid aliphatic alcohols which are low enough in molecular weight to vaporize expeditiously from the site of application of the fertilizer are required. Continued presence of the alcohol at the site after application is undesirable. Saturated aliphatic alcohols containing 1 to 4 carbons in their skeletal chains fit the requirement for vaporization from the soil. Methyl is the preferred alcohol because it is the most effective alcohol as a polymer stabilizer at low concentrations. It is effective in improving the stability of the urea-formaldehyde polymer based fluid fertilizer in concentrations as low as 0.05% (wt.). Under some storage conditions, such as high temperature or slight acidity, alcohol concentrations as high as 1.0% are required and higher alcohols such as n-butyl alcohol can be used. Aliphatic alcohols are preferred because of their lower reactivities, higher vapor pressures and lower toxicities.

Water soluble sugars, especially those sugars reactive enough to reduce Fehlings solution, provide improved storage stability for the fluid urea-formaldehyde polymer fertilizer suspension. When the fertilizer is applied to grass, turf or other crops, the sugars stimulate the microbial activity in the soil required for conversion of the nitrogen contained in the water insoluble polymers to the soluble nitrogen required for plant nutrition. The microbial activity stimulated by the sugar allows the use of highly polymerized urea-formaldehyde compounds so that burning of the grass by soluble nitrogen is not a problem. The exact chemical reaction between the carbonyl of the sugars and the urea-formaldehyde polymer is not well understood. The chemical reaction causes thickening and gel formation which stabilizes the suspension and inhibits layer separation and precipitation.

Effective amounts of sugars range from about 1%, by weight, to 10%, or higher. Larger amounts of sugars may be used, but are not required and are not normally economically desirable. Molasses was found to be the most effective form of sugars for this invention. Molasses is also the most economical of the effective sugars. Cane molasses and beet molasses are both equally effective in stabilizing the liquid fertilizer and in stimulating the microbial activity at the application site. Hydrolyzed wood molasses such as "Masonex" comprising lignin sulfonates, pentoses, and other reducing sugars is effective in promoting decomposition of the urea-formaldehyde polymers at the application point. The hydrolyzed wood molasses also provides added stability to the fertilizer suspension, but higher concentrations of wood molasses are required than cane or beet molasses. For good gel formation and fertiizer stability, molasses having a density of 75 to 96 Brix is needed.

Heavier molasses than 96 Brix are not effective in gel formation and high molecular weight, water insoluble sugars such as alpha cellulose are not effective in this invention. Other sugars having appreciable water solubility, such as soluble starch, are effective. Relatively small amounts of soluble starch are effective for gel formation and fertilizer stabilization, but are somewhat less effective than the highly soluble sugars as cane molasses in stimulating the microbially activated release of nutrient nitrogen from the urea-formaldehyde polymers.

When the sugar-urea-formaldehyde gel is produced, viscosity in the fluid fertilizer is increased. To provide storage stability the viscosity of the fluid is allowed to increase to 100–600 centipoises, and preferably maintained between 200 and 350 centipoises measured at 85° F. Control of the amount of water in the fluid fertilizer is maintained between 35 and 50% (wt) to provide product which is stable for extended periods of storage, but which may be readily pumped and handled. The product may be diluted just prior to distribution with copious amounts of water to provide a thin fluid for distribution and application. Water concentrations at or above 60%, by weight, allow rapid phase separations and allow solids to settle out of the suspensions. Specific gravity must be closely maintained between 1.10 and 1.20 grams per milliliter by addition of water, or other solid or liquid materials such as ammonium and potassium salts, to give a total solids concentration of about 60%, by weight.

The fluid fertilizer of this invention is best suited for application as a complete fertilizer containing all of the primary plant nutrients; nitrogen, phosphorous and potassium. The secondary plant food elements and the micronutrients are readily available and normally included in the composition of this invention. The plant nutrients other than nitrogen used to complete the fluid fertilizer are preferably water soluble or finely divided solids. Thus liquid ammonium polyphosphate solution is preferred over coarse granules of triple superphosphate. Fine triple superphosphate or any other insoluble solid may be used but are best sized to pass through a 12 mesh Tyler screen. In the composition of this invention the urea to formaldehyde mol ratio used to form the urea-formaldehyde polymer may be varied somewhat between 1.6 to 1.0 and 2.0 to 1.0, and is preferably held close to 1.75 to 1.0. With urea to formaldehyde ratios higher than 2.0 to 1.0 the amount of nitrogen immediately available at the site of fertilizer application is high enough to cause grass damage particularly in relatively warm, dry conditions. Ratios lower than 1.0 urea to formaldehyde are expensive and may allow some free formaldehyde which is toxic to plant life. Polymers that are formed at these low ratios have poor nitrogen release characteristics.

The storable fluid urea-formaldehyde-based fertilizer composition must have a closely controlled pH between 6.0 and 7.0, and preferably between 6.1 and 6.5. At acidities higher than indicated by pH 6, growth of the urea formaldehyde polymers continues. Although the mechanism of this polymerization is not well understood, it results in increased fluid viscosity, solidification of the suspension, and separation of liquid and solid phases in the fertilizer. Auto-oxidation and formation of formic acid occurs at pH's close to 7.0. The formation of formic acid also destroys the stability of the fluid fertilizer suspension by catalyzing continued condensation of the urea-formaldehyde compounds.

DESCRIPTION OF THE PREFERRED EMBODIMENTS

The following examples illustrate the significance of the new fluid fertilizer compositions of this invention in terms of slow release of nitrogen nutrient; fertilizer stability; fertilizer efficacy; and the optimum presence of all components. All parts and percentages are by weight unless otherwise specified.

EXAMPLE 1

This example demonstrates the preferred composition and its preparation.

To a 1200 gallon jacketed stainless steel reactor 600 pounds of hot water, 5 pounds of 50% NaOH solution, 864 pounds of urea formaldehyde concentrate-85 (25% urea-60% formaldehyde), and 1605 pounds of crystal urea (46% nitrogen) were added, with vigorous stirring, and maximum steam heating on the jacket to bring reaction temperature to 185° F where the mixture was a clear solution and pH ws higher than 11. After the solution was complete, 1220 pounds of cool water was added directly to the reaction mixture to reduce temperature to 130° F.

While cooling water was circulated through the reactor jacket and the reactor contents were vigorously agitated, 85 pounds of green, wet process, orthophosphoric acid was added slowly to bring pH of the reaction mixture to 4.6. The mixture turned cloudy when addition of the phosphoric acid was started and heat was generated by the urea-formaldehyde polymerization. Temperature of the mixture was allowed to increase to 160° F and then held at that level for about 15 minutes until the reaction mixture had a thin, creamy consistency. Viscosity was 200 centipoises on a sample cooled to 85° F. When the thin creamy consistency was achieved, aqua ammonia amounting to 15 pounds of 28% NH$_3$ was added to bring pH to 6.3, and water was circulated to cool the reactor contents to 90° F.

While stirring was continued in the reactor, 558 pounds of ammonium polyphosphate solution, containing 10% nitrogen and 34 % phosphorous pentoxide; and 291 pounds of crystalline potassium chloride, containing 62% potassium oxide, with 95% passing through a 20 mesh Tyler screen, were added. The three ton batch of fluid fertilizer was completed by addition of 600 pounds of 85 brix cane molasses and 6 pounds of ACS reagent grade methyl alcohol while agitation was continued. Viscosity of the final product at 85° F was 250 centipoises, as measured by a Brookfield viscosimeter. pH was 6.4 and density was 1.150 grams per milliliter. The fluid fertilizer was a homogeneous brown-colored, smooth liquid with no material settled on the bottom of the storage tank. Analyses obtained by methods in "Official Methods of Analysis of the Association of Official Agricultural Chemists", Tenth Edition, 1965, are listed as follows:

| Component | Wt. % |
| --- | --- |
| Free Water | 40.9 |
| Total water soluble sugars (as sucrose) | 5.1 |
| Total nitrogen (method 2.044) | 15.0 |
| Water insoluble nitrogen (method 2.057) | 12.0 |
| Hot water soluble nitrogen (method 2.062) | 4.2 |
| Activity Index (AI) | 35 |
| Phosphorous (as P$_2$O$_5$) | 5.0 |
| Potash (as K$_2$O) | 3.0 |
| Methyl alcohol | 0.1 |

The portion of the nitrogen fed as urea was 93.08% with remaining ammonium nitrogen unavailable for conversion to water insoluble nitrogen. Conversion of nitrogen to water insoluble form in the fluid fertilizer ws 80.0%, and portion of urea nitrogen converted was 86%.

EXAMPLE 2

This example demonstrates stability and storability of preferred composition.

Product from Example 1 was stored in 4 one-quart small-mouth glass sample bottles, and in a 6000 gallon mild steel storage tank for 60 days. Two of the quart samples were stored with closed caps in a refrigerator at 3° C and the other two-quart samples were stored at ambient room temperatures of about 25° C. The refrigerated sample was viscous and thixotropic during storage but remained pumpable throughout the storage period. At the end of the 60 day test, the refrigerated samples were allowed to warm to room temperature and viscosity was determined to be 270 centipoises. The quart sample stored at ambient room temperature remained fluid throughout the test period and viscosity was 280 centipoises.

The remaining product stored in the steel tank was thixotropic during cool early spring storage but was readily agitated by air sparging or mechanical stirring and remained pumpable. After 60 days storage, sample viscosity was 270 centipoise and pH was 6.3. No appreciable amount of material had settled to the bottom of the tank, all separation of the clear liquid and syspension phases was not appreciable. No mold or other product degradation was observed.

EXAMPLE 3

This example demonstrates practical applicability of preferred composition.

Product from Example 2 was pumped through flood-type agricultural liquid applicators and evenly spread onto turf. The product from Example 2 was also diluted with water in a ratio of three parts of water per part of fluid fertilizer to give a thin fertilizer liquid which could be evenly spread on turf with flood or fan nozzle agricultural applicators. Phase separation occurred in the diluted fertilizer liquid, with clear layers appearing on the top of the liquid, and solids on the bottom in 15 minutes, or less, without agitation. Storage of the diluted fertilizer at ambient room temperture for a 14 day period resulted in fermentation of some of the sugar content of the fertilizer.

EXAMPLE 4

This example demonstrates the loss of stability and storability when composition is changed from preferred embodiment of this invention.

Dilution of product from Example 2 with only 0.4 part of water per part of fluid fertilizer gave a specific gravity of 1.08 grams per milliliter and resulted in phase separation, solids settling, and fermentation in a storage period of 7 days at ambient room temperature.

EXAMPLE 5

This example demonstrates the non-burning properties of the preferred composition of this invention.

Kentucky-31 tall fescue grass turf was cut into 10 inch square by 2½ inches deep pieces and placed in 12 separate, drained, aluminum pans. The height of the well established grass, when it was transferred, averaged about 3 inches, each pan contained about the same number of grass plants, and the appearance of the grass was about the same in each pan. Two of the pans of turf, numbers 1 and 2, were given adequate water, but no fertilizer, and served as the experimental control. Grass in these pans continued to live, but at the end of 60 days in the greenhouse, with weekly clippings to a height of 3 inches the color was pale green and the grass blades were thin. The next two pans, 3 and 4, were evenly sprayed with a 15N-5P$_2$O$_5$-3K$_2$O liquid fertilizer made from ammonium polyphosphate solution, ammonium nitrate-urea solution, and potassium chloride. This fertilizer was applied at a rate of 8 pounds per 1000 square feet, diluted by water to 1% nitrogen. Within 72 hours the turf treated with the 8 pounds of water soluble nitrogen turned yellow and in several days appeared to have little life.

Pans 5 and 6 were treated with 4 pounds nitrogen per 1000 square feet of the same water soluble fertilizer used in pans 3 and 4. Burning of the grass occurred as in pans 3 and 4, although more grass plants survived the treatment. After 60 days, recovery from the burning was well established, but the turf was by then uneven and where the turf was growing it has about the same appearance as the untreated pans 1 and 2.

Pans 7 and 8 were treated with 8 pounds per 1000 square feet of the 15N-5P$_2$O$_5$-3K$_2$O fertilizer from Example 1. The grass showed no sign of burning or damage, but within 72 hours after treatment the grass assumed and then maintained a dark, verdent appearance thoughout the 60 day test period. Similar results were obtained in pans 9 and 10 where 4 pounds of nitrogen per 1000 square feet was applied from the fluid fertilizer of Example 1. In pans 7, 8, 9, and 10, much of the fluid fertilizer hit the grass blades and could be seen remaining on the foliage without damage until removed by cutting or eventual dissolution.

In pans 11 and 12, the fluid fertilizer from Example 1 was diluted with 3 parts of water and applied at the rate of 4 pounds nitrogen per 1000 square feet. Results were similar to those obtained without dilution. The appearance of the dark green color in the grass was slightly quicker with the diluted fertilizer from Example 1 than from the undiluted slow-release fertilizer products.

EXAMPLE 6

This example demonstrates the efficacy and the long term continuing release of nitrogen nutrient to grass turf compared to soluble nitrogen fertilizers and to no fertilizer.

Kentucky-31 tall fescue grass turf was prepared as in Example 5 and the turf in 6 pans was drenched daily with water for a 7-day period to remove as much residual plant food as possible. The grass in each pan was cut to a 2½ inch height and treated with test fertilizer samples. Moisture was maintained in the samples by treating them frequently and evenly with water. Good drainage was provided by holes in the bottom of the pans. Pans were maintained in a sunny, 70°–72° F, and 40–45% relative humidity evironment throughout the 60-day test period. The grass was clipped to a 2½ inch height each 10 days and the clippings from each pan were recovered, dried in a 105° C oven for 4 hours and weighed. From the weights the growth rate, indicative of the availability of plant food, was recorded as pounds per 1000 square feet per day. Results are shown in the following table.

| | | Effect of Type Fertilizer on Grass Growth All Test Fertilizers Analyses 15-5-3 | | | | | | |
|---|---|---|---|---|---|---|---|---|
| | | Nitrogen Rate | Dry Weight Clippings - Pounds per Day per 1000 Square Feet | | | | | |
| Pan No. | Fertilizer Type | Lbs N/ 1000 ft² | 0–10 Days | 10–20 Days | 20–30 Days | 30–40 Days | 40–50 Days | 50–60 Days |
| 1. | Example 1 | 4 | .49 | .44 | .47 | .39 | .37 | .41 (3) |
| 2. | Example 1 Diluted 3/1 with H$_2$O | 4 | .45 | .53 | .71 | .37 | .42 | .44 (3) |
| 3. | APP, UAN, KCl (1) | 8 | .31 (2) | .16 | .18 | .24 | .16 | .20 (2) |
| 4. | APP, UAN, KCl (1) | 4 | .61 | .51 | .47 | .43 | .31 | .22 (5) |
| 5. | None | 0 | .38 | .39 | .25 | .32 | .27 | .21 (4) |
| 6. | Example 1 | 8 | .76 | .74 | .97 | .80 | .87 | .91 (3) |

(1) APP - Ammonium polyphosphate solution (10-34-0)
UAN - Urea, ammonium nitrate solution (28-0-0)
KCl - Commercial potassium chloride
(2) Severe grass burn, many plants dead.
(3) Deep green color.
(4) Pale green color.
(5) Some grass burn, yellow color after fertilizing.

EXAMPLE 7

This example demonstrates that presence of aliphatic alochol is required for optimum stability and storability of liquid fertilizer composition of this invention.

Liquid fertilizer analyzing 15% nitrogen-5% phosphorous pentoxide-and 3% potassium oxide was prepared in the laboratory in the manner of Example 1, except that no alcohol was added to the mixture. The final product, including the same amount of 85 Brix cane molasses, as in Example 1, was tested on grass turf and found to be non-burning and to start to release nitrogen for growth of turf within 24 hours. Storage of samples in closed, small-mouth sample bottles resulted in viscosity increases from 240 centipoises at 85° F to 375 centipoises after 7 days storage. Sample was found to be gelled and very difficult to pump after 30 days storage at ambient room temperature. After 30 days, the product was considered to no longer have physical properties suitable for commercial use as liquid fertilizer.

EXAMPLE 8

This example demonstrates that the presence of malasses is needed for optimum stability and for release of nitrogen to turf after application.

Liquid fertilizer analyzing 15% nitrogen, 5% phosphorous pentoxide and 3% potassium oxide was prepared in the laboratory in the manner of Example 1, except that 10% water was added to the mixture instead of the 10% molasses, giving a total water content of about 51%.

Storage of product samples in closed small-mouth quart bottles resulted in the appearance of a small clear liquor at the top of the sample in 48 hours, indicating that phase separation has begun. After 30 days storage, about one inch clear layer phase was found at the top of the bottle.

Treatment of turf in the greenhouse with the fertilizer at the rate of 4 pounds nitrogen per 1000 square feet resulted in production of 0.55 pounds of dried grass clippings per day for the first 10 days after fertilization compared to 0.34 with no fertilization and 0.70 with the same amount of nitrogen from Example 1.

EXAMPLE 9

This example demonstrates that addition of water to levels above 60% causes product to quickly lose stability and to be unsuitable for storage.

Product from Example 1 was diluted with water until water concentration reached 63%. Resulting material was stored at ambient room temperature. After 6 hours storage, considerable amounts of the solids had settled to the bottom of the bottle and there was 2 inches of clear liquid on top of the sample indicating phase separation and lack of storability of the sample.

EXAMPLE 10

This example demonstrates that water soluble sugars are required for stability of liquid fertilizer composition of this invention.

Three fertilizers, analyzing 15% nitrogen, 5% phosphorous pentoxide, and 3% potassium oxide, were prepared in the laboratory by the same procedure as Example 1, except that the 10% 85 Brix cane molasses was substituted in the first sample by 5% soluble starch plus 5% water; in the second sample by 5% alpha cellulose and 5% water; and in the third by 10% "Masonex" molasses from wood hydrolysis.

The samples were stored in closed, small-mouth one-quart bottles. The sample using the alpha cellulose separated into a clear liquid phase and a solid phase settled out on the bottom of the bottle in 5 days. After 30 days storage, the fertilizer sample containing the soluble starch was essentially homogeneous, with a viscosity of 270 centipoise, and was suitable for use as a liquid fertilizer. The sample containing Masonex after 30 days storage was suitable for use as a liquid fertilizer with a viscosity of 250 centipoises. There was a small clear layer at the top of the sample.

EXAMPLE 11

This example demonstrates that pH of fertilizer composition must be held in close range to obtain storability.

Two liquid fertilizer samples, analyzing 15% nitrogen, 5% phosphorous pentoxide, and 3% potassium oxide were prepared in the laboratory by the same procedure as Example 1, except that a pH of 5.9 was obtained in the first sample and pH of 7.4 in the second sample. Storage of samples in closed small-mouth quart bottles for 30 days resulted in both forming non-pumpable, semi-solids, unsuitable for use as fluid fertilizers.

EXAMPLE 12

This example demonstrates that ingredients and analysis may be varied within the specified composition of this invention to make useful products but alcohol additive is required for long-term storability.

The following ingredients were added at ambient temperature to a 400 ml beaker with constant agitation: 32 grams UFC-85, 10 grams water, 5 grams 28% aqua ammonia, 57 grams crystal urea, and 1 gram 50% sodium hydroxide. The mixture was slushy originally at pH 12+ and cooled to 15° C. As the mixture was heated to 40° C, the slush turned to a milky solution, and was water clear at 90° C. The temperature was held at 90° C for 10 minutes, causing pH to decrease to 8 and the solution to become hazy. Cool water amounting to 23 grams was added to give a slightly milky solution containing no sediment at 62° C.

pH was decreased to 4.0 by adding 6 grams of superphosphoric acid (68% $P_2O_5$) and 15 grams water. The solution became creamy and it thickened while being held at 55°–65° C for 30 minutes. It was then neutralized to pH 6.3 with 4 grams of 28% aqua ammonia and cooled to room temperature to give a stable urea-formaldehyde fertilizer base.

To the base was added 20 grams of fine grade agricultural potash (62%$K_2O$), 50 grams water, and 40 grams of ammonium polyphosphate solution (10%N-34%$P_2O_5$-0%$K_2O$) with strong agitation at 45° C to give a white, creamy, slightly thixotropic product, weighing 248 grams. To this material was added 87 grams of 90 Brix sugar beet molasses to produce a brown, smooth fluid fertilizer with composition as follows:

| Component | Wt % |
| --- | --- |
| N | 10.3 |
| $P_2O_5$ | 5.0 |
| $K_2O$ | 3.5 |

The product was storable in useful form for 7 days and was effective in promoting growth of grass turf. At the end of 10 days storage in a closed small-mouth bottle, viscosity had increased so that it was semi-solid and difficult to pump.

EXAMPLE 13

This example demonstrates that variations can be successfully made in preparation and additives within the compositions defined.

The following ingredients were added at ambient temperature to a 400 ml beaker in the order indicated: 32.0 grams UFC-85, 38.0 grams water, and 57 grams urea. The thin slush was heated to 55° C and became clear. The pH was decreased from 7.3 to 4.2 by continued heating at 65° C for 145 minutes and the solution formed a thin, creamy suspension. Aqua ammonia amounting to 3.0 grams was added to bring the pH up to 6.6 and 55 grams of Southern States 85 Brix molasses was added with vigorous agitation and cooling. While continuing to stir at about 40° C, 35 grams of diammonium phosphate (18%N-46%P$_2$O$_5$), 50 grams of water, 3.0 grams isobutyl alcohol, and 20 grams of fine grade potassium chloride were added. Final pH of the smooth, brown-colored suspension was 6.3. Analysis of the fertilizer gave results as follow:

| Component | Wt % |
|---|---|
| N | 13.8 |
| P$_2$O$_5$ | 6.2 |
| K$_2$O | 4.9 |
| Isobutyl alcohol | 1.1 |
| Sugars | 12.1 |

Product viscosity decreased during 30 day storage test from 230 centipoises to 200 and a small amount of solids settled out onto the bottom of the closed small-mouth quart sample bottles.

I claim:

1. A non-burning, storable, liquid suspension grass turf fertilizer composition with improved stability and turf growth stimulation, comprising: 40 to 45% water; 12 to 16% nitrogen from urea formaldehyde polymers having a urea to formaldehyde mol ratio of 1.6/1 to 2/1 with no free urea of formalehyde, with 60 to 80% of the nitrogen present in the water insoluble form, and the water insoluble nitrogen having an activity index of 25 to 0.20% by weight insoluble nitrogen having an activity index of 25 to 35; 0.05 to 0.20% by weight methyl alcohol; and 3 to 6% by weight of water soluble sugars in the form of 75 to 96 Brix cane or beet molasses.

2. Complete fertilizer composition of claim 1 comprising 12 to 16% by weight nitrogen from urea formaldehyde polymers; 4 to 10% by weight phosphorous pentoxide from ammonium polyphosphate solution; and 3 to 8% by weight of potassium oxide from potassium chloride; with said fertilizer composition having properties of 1.10 to 1.20 grams per milliliter specific gravity, 6.1 to 6.4 pH, and a kinematic viscosity of 200 to 350 sentistokes.

* * * * *